United States Patent [19]

Janian et al.

[11] 4,133,542
[45] Jan. 9, 1979

[54] SPRING SEAL

[76] Inventors: Robert Janian, 12630 Miranda St., N. Hollywood, Calif. 91607; Rolla J. Boyer, 11043 Newcomb Ave., Whittier, Calif. 90603

[21] Appl. No.: 719,086

[22] Filed: Aug. 31, 1976

[51] Int. Cl.² .......................... F16J 9/06; F16J 15/32
[52] U.S. Cl. .................................... 277/152; 277/164; 277/205
[58] Field of Search ............... 277/152, 205, 164, 157, 277/162, 138; 267/1.5

[56] References Cited

U.S. PATENT DOCUMENTS

| | | | |
|---|---|---|---|
| 2,512,883 | 6/1950 | Warren | 277/152 |
| 2,594,164 | 4/1952 | Hedberg | 267/1.5 |
| 3,114,561 | 12/1963 | Creath et al. | 277/205 |
| 3,281,156 | 10/1966 | Mayhew et al. | 267/1.5 |
| 3,357,693 | 12/1967 | Perry | 267/1.5 |
| 3,837,631 | 9/1974 | Evans et al. | 267/1.5 |
| 3,901,517 | 8/1975 | Heathcott | 277/205 |

*Primary Examiner*—Richard E. Aegerter
*Assistant Examiner*—L. Footland
*Attorney, Agent, or Firm*—Romney, Schaap, Golant, Scillieri, Disner & Ashen

[57] ABSTRACT

A seal comprising a spring having an enlarged diameter base mounted in the heel of a seal casing to enable flared arms extending forwardly from the base to freely exert by cantilever action an outwardly directed spring bias against the casing while the spring is retained by its base in the casing.

1 Claim, 15 Drawing Figures

SPRING SEAL

FIELD OF THE INVENTION

This invention relates to mechanical seals generally, and more particularly to cover seals of various materials having inner springs to provide the necessary resiliency for sealing the passage between two adjacent surfaces.

BACKGROUND OF THE INVENTION

In the past, conventional springs mounted in a sealing jacket or casing have often lost their resilient sealing capabilities when subjected to repeated use under extreme pressures and temperatures. It is believed that such failures have been caused by poor construction features of the spring/cover combination whereby the forward flexing ends of the spring are held in fixed longitudinal position by the overlapping forward lips of the cover while the central spring leg moves back and forth in the inner cavity of the cover to accomodate the lateral flexing of the spring. Such prior art structure results in bad performance by both the spring and the cover or jacket. Such prior art seal/cover combinations have therefore failed to provide continuous reliable sealing along a smooth evenly loaded sealing surface over extended periods of time.

SUMMARY OF THE INVENTION

It is an object of the present invention to provide an improved spring/casing combination which overcomes the deficiencies of the prior art. To this end, an improved spring is formed from a single strip of metal to provide a plurality of opposing flared arms each extending from an enlarged concave base. The casing is machined out to provide a heel portion for fixedly mounting the base thus allowing the arms to extend outwardly for lateral flexing of the arms as cantilevers extending from the fixed base. The sealing lips portion of the casing is biased outwardly by the inner spring flexing of the arms while still leaving the arms to freely move relative to the casing.

Additional purposes, objects, features and advantages of the invention will be evident to those skilled in the art from the following description of exemplary embodiments of the invention.

DRAWING

DESCRIPTION OF THE PREFERRED EMBODIMENTS

Figure 1:
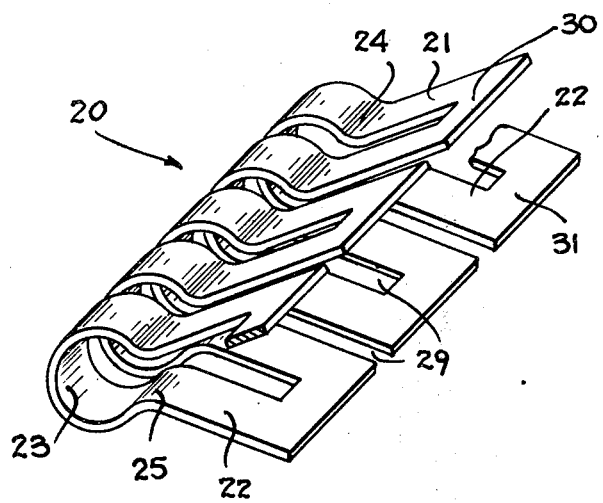
FIG. 1 is a perspective view of a presently preferred form of spring.

Referring to the drawings, the preferred form of the spring 20 includes opposing first and second arm members 21, 22 extending outwardly from a base 23 which is preferably an enlarged concave shape which joins through first and second junctions 24, 25 to the respective arm members.

Figure 3:
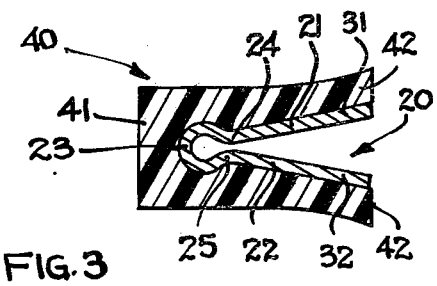
FIG. 3 is a sectional view of the spring of FIG. 1 mounted in a casing.
Figure 4:
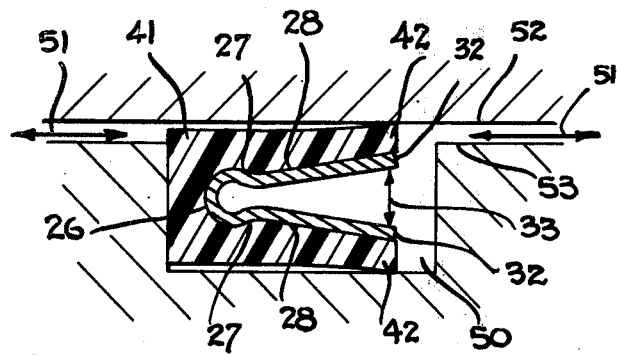
FIG. 4 is a sectional view of the spring/casing combination of FIG. 3 in sealing engagement between two surfaces.

As best shown in the sectional views of FIGS. 3 and 4, the enlarged diameter defined by the outer surface 26 of the base is engageable with the portion of a casing or cover 40 having a heel 41 which snugly fits against the outer junction surfaces 27 to hold the base of the spring in fixed position in the casing with the arms free to move relative to the casing as the load forces the spring biased arms to change position. This enables the outer arm surfaces 28 to be in continuous abutting contact with the surrounding casing along the full length of the arm to facilitate the transfer of even, constant pressure from the spring biased arms through the casing to its sealing lips 42.

In order to provide sealing along an elongated junction, an elongated spring assembly as shown in FIG. 1 is provided having slots 29 between adjacent arms, with the slots protruding alternately from the exterior of the spring to connectors 30, 31 which hold adjacent arms together. Thus, the spring force is transmitted by cantilever action from the base through the arms to the tips 32 on the forward edges 32 of the connectors to provide the spring force in the outward direction shown by the arrow 33. (See FIG. 4).

Figure 2:
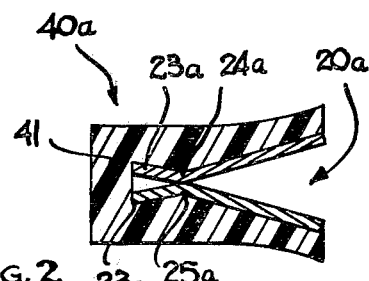
FIG. 2 is a sectional view of a modified spring mounted in a casing.

In an alternate construction for a spring 20a, as shown in FIG. 2, it is possible to have separate spring members with divergent bases 23a in the rear of the casing to hold the spring in position by the constricting action of the casing against the inwardly bent junctions 24a, 25a between the base and the arms.

Figure 5:
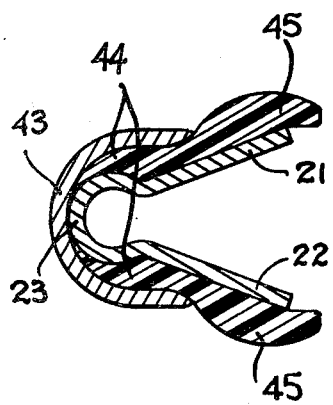
FIG. 5 is a sectional view of the spring of FIG. 1 mounted in a modified casing.

Of course, the spring is suitable for mounting in other forms of jackets such as shhown in FIG. 5 wherein an abbreviated cup 43 carries a sealing material 44 which serves to hold the base of the spring in fixed position while the spring arms move freely to exert outward spring bias against the sealing lips 45, which may where desirable extend beyond the forward ends of the spring arms.

However, as best shown in FIG. 4, in the preferred embodiment, the heel is typically designed for insertion in a groove 50 which serves as a gland formed between two opposing surfaces 52, 53 to receive the seal unit and prevent passage of fluid or the like in the longitudinal direction shown by the double arrow 51. Under such circumstances, it was found preferable to have the outer shape of the cover 40 conform to the shape of the groove, with the ends of the spring arms and the cover substantially coincident thus providing a sealed joint without the need for any additional sealing material other than the jacket or cover itself, with its resilient memory provided by the spring.

Figure 7:
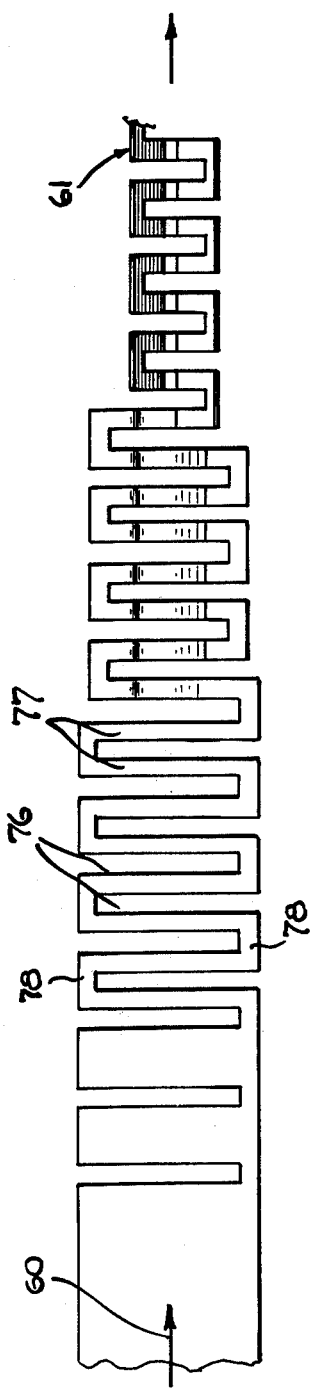
FIG. 7 shows a spring strip of the type shown in FIG. 1 in various stages of manufacture.
Figure 8:
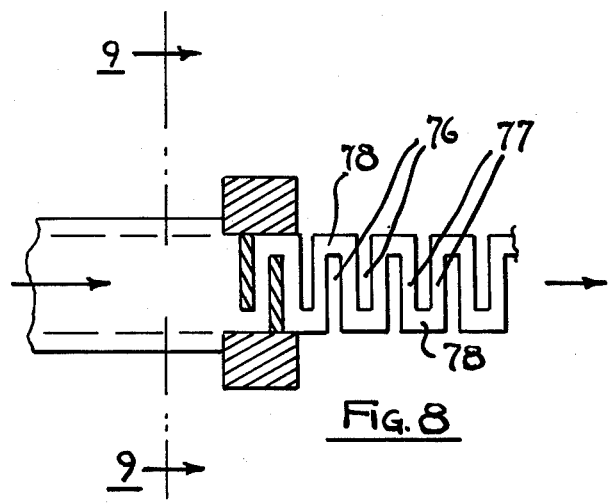
FIG. 8 is a top view in partial section showing a spring strip being punched by an exemplary slotting die.
Figure 9:
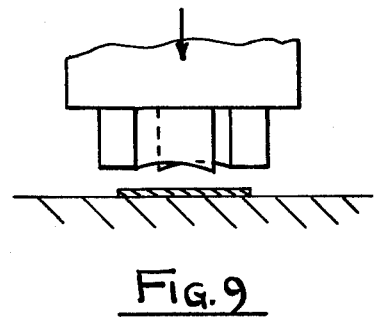
FIG. 9 is an end view taken along the line 9—9 in FIG. 8.
Figure 10:
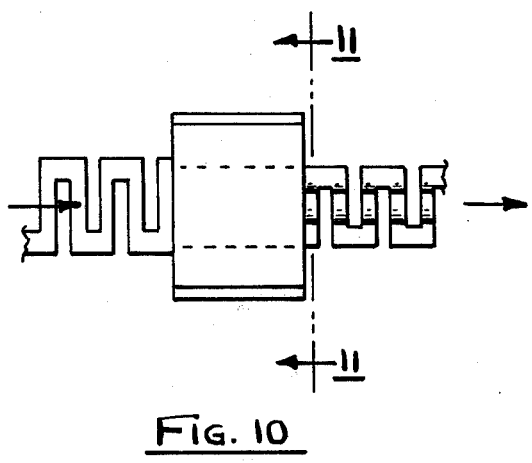
FIG. 10 is a top view showing a slotted spring strip being dimpled by an exemplary shaping die.
Figure 11:
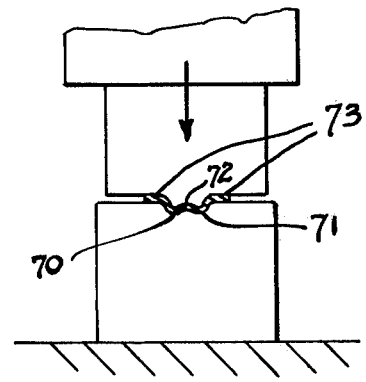
FIG. 11 is an end view taken along the line 11—11 in FIG. 10.
Figure 12:
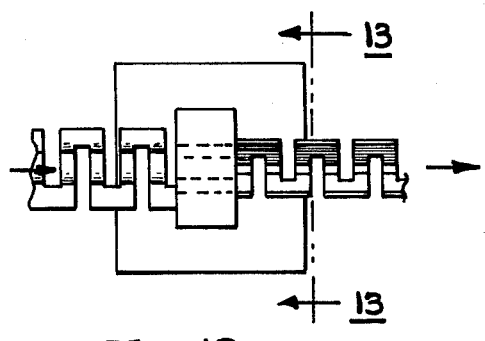
FIG. 12 is a top view showing a slotted, dimpled spring strip being contracted together by a different exemplary shaping die.
Figure 13:
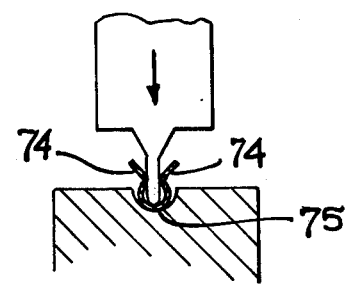
FIG. 13 is an end view taken along line 13—13 in FIG. 12.

The shape of the spring is important to provide proper mounting in the heel of the casing as well as to provide maximum outward spring bias of the arms when subjected to a load. Although a progressive die system can be used to punch and then shape a strip of metal from initial stages shown at 60 to a completed spring shown at 61, in FIG. 7, an optimum system was developed with a minimum number of steps and tooling, as shown in FIGS. 8-13.

More specifically, a base is formed by impressing a concave depression in the form of two downward dimpled recesses 70, 71 with a transverse ridge or hump 72 therebetween while holding the spring arms 73 in aligned horizontal position. The hump can then be pushed downwardly to draw the surrounding concave depression upwardly to form a cross-sectional loop shape having flared arms 74 extending from an enlarged concave base 75.

Where an elongated spring is made, the strip is first punched with lateral slots 76 to form the plurality of lateral arms 77 alternately connected through end members 78. The aforementioned shaping steps are then performed sequentially on each lateral arm.

Figure 6A:
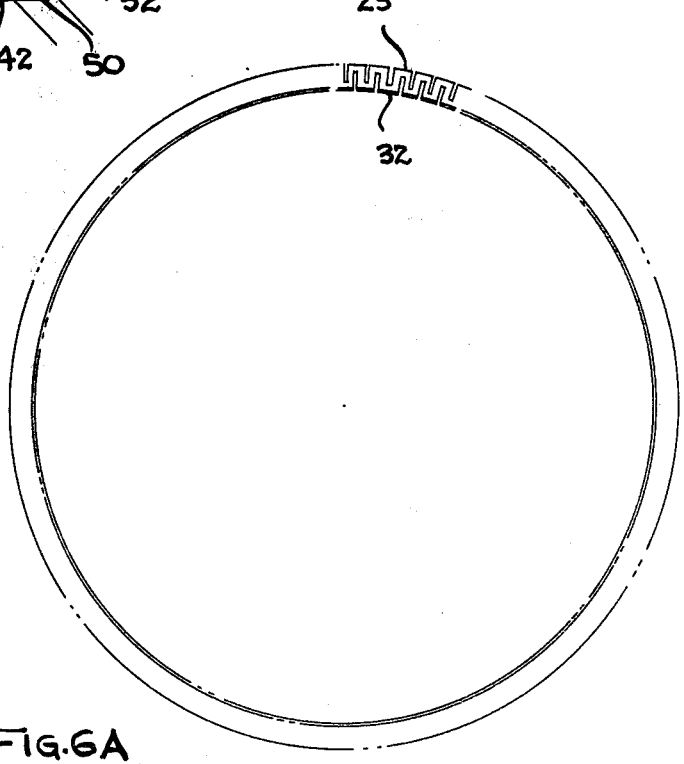
FIG. 6A shows the spring of FIG. 1 in circular form with the flared arms pointing inward for use in a face seal
Figure 6C:
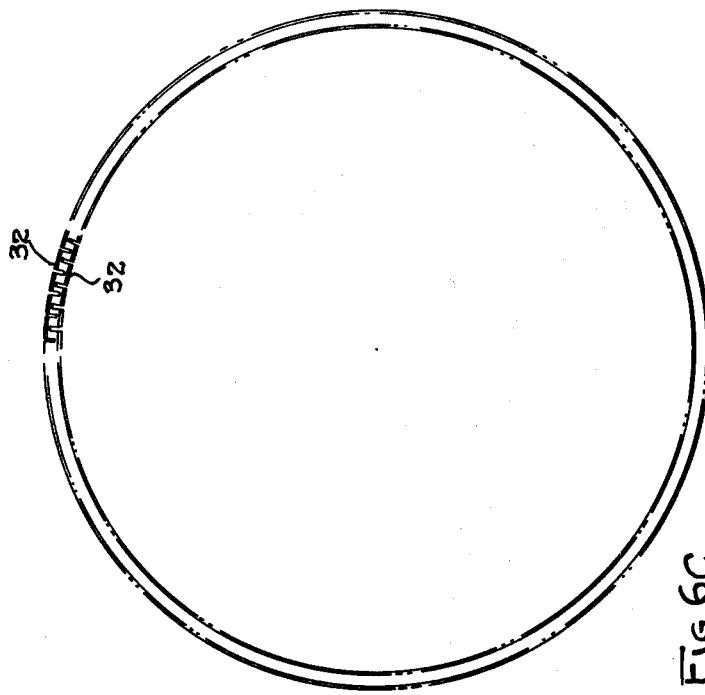
FIG. 6C shows the spring of FIG. 1 in circular form with the flared arms pointing up from the plane of the paper for used in an inside or outside diameter radial seal.
Figure 6B:
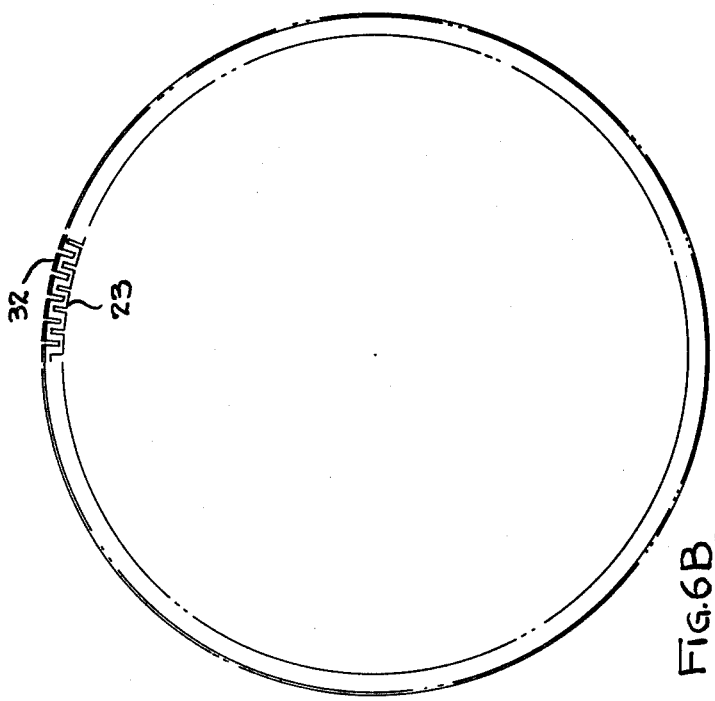
FIG. 6B shows the spring of FIG. 1 in circular form with the flared arms pointing outward for use in a face seal.

The aforementioned structure can then be rotated about its base for sealing directed in any direction (See FIGS. 6A, 6B, and 6C). Accordingly, in view of the foregoing description, it will be appreciated by those skilled in the art that the invention provides a unique spring/cover combination wherein the flexible spring arms and the surrounding cover are in substantial alignment, notwithstanding the degree of flexing caused by the load being carried by the seal lips of the casing. Similarly, in the preferred form, the forward end of the arms is substantially coincidental with the forward end of the seal lips of the casing, thereby eliminating either spring or cover protrusion. This alignment between the cover and the spring is maintained and controlled by the use of a unique base seated in the heel of the casing. Also, if for some reason the spring base is removed from the heel, it can be reinserted, so that when the casing/spring insert is placed in the gland between the two adjacent surfaces and subjected to a load, the compression of the opposing spring seals automatically locks the base of the spring in the matching seat or groove in the heel of the casing.

Moreover, by leaving the forward ends of the spring arms free from any longitudinal, forward restraint, the seal cover can be machined to fit snugly into mating relationship with the entire outside surface of the spring, thus preventing undesirable twisting or bulging behind the sealing surfaces during operation. Such construction in many instances virtually eliminates the need for conventional back-up rings. This also leaves the forward spring arm ends which have the maximum flexing displacement capability in direct contact with the forward ends of the seal lips, providing a positive seal along the preferred sealing surface of the cover.

Additionally, by providing a work hardened base for the spring, it is possible to achieve more resiliency in the actual sealing area of the casing. As described previously, such work hardening occurs during the various steps of the forming operation as shown in FIGS. 8 through 13.

Openings and gaps between the various adjacent surfaces of the spring/casing combination are avoided, thus providing a smooth loading surface maintained by the cantilever spring action of the arms impelled outwardly by the enlarged concave base of the spring. Thus, continuous loading is transmitted from the spring base through the outwardly biased arms to the sealing surfaces along the edges of the seal lips of the casing.

Additionally, elimination of the usual cavity at the rear of the casing enables use of a jacket or casing of reduced overall thickness, thus preventing the jacket from over-restraining the resilient action of the spring.

Because of the unique spring features of the invention, various cover materials can be used, including Teflon, Kel-F, FEP, Kynar, polimides and filled fluorocarbon compounds. In addition, elastomers such as viton, Buna, silicones, and the like which require a low stress deflection ratio are also available. The elastomeric life of the cover is thereby increased due to the constant pressure being exerted on the sealing surfaces even though the elastomers themselves may become embrittled as a result of operational use. The unique structure of the spring, as described hereinabove, also enables various materials to be encapsulated around the spring rather than merely removably mounting the spring inside a casing.

All of the foregoing features and advantages are accomplished through a simple and reliable manufacturing method, thereby eliminating the usual complicated machining and assembly required for other spring assemblies.

Although exemplary embodiments of the invention have been disclosed and discussed, it will be understood that other applications of the invention are possible and that these embodiments may be subjected to various changes, modifications, and substitutions without departing from the invention.

We claim as our invention:

1. A sealing device comprising:
   a unitary spring member including a base with a first diameter and having a convex surface extending fully around its exterior, and further including a pair of opposite arms together having a generally V-shaped cross section and rearwardly connected to said base through a narrow neck having a second diameter less than said first diameter and with forwardly divergent free ends normally separated a third distance greater than said first diameter; and
   a casing in contact with a sealing surface and including a channel for receiving said spring, said channel having a heel formed at the rear of said channel by concave end wall means extending fully around said heel for snugly abutting said exterior convex surface of said spring base, and further having an entrance passage formed at the front of said channel by forwardly divergent side wall means for snugly abutting the outside surface of said spring arms leaving said spring arms free of any circumferential constraint directed rearwardly against said forward ends of said spring arms, and further having constricted junction means between said end wall means and said side wall means for engaging said neck to securely hold said base of said spring in cantilever fashion in said heel of said casing while enabling the forward end of said spring arms to flex freely exerting a lateral sealing force against said side walls of said casing.

* * * * *